United States Patent [19]

Keffeler

[11] Patent Number: 5,011,018

[45] Date of Patent: Apr. 30, 1991

[54] MEDICATION DISPENSER WITH REMOVABLE LINER

[76] Inventor: Paul J. Keffeler, 9706 Brentwood Rd., Omaha, Nebr. 68114

[21] Appl. No.: 557,197

[22] Filed: Jul. 24, 1990

[51] Int. Cl.⁵ .......................... B65D 83/04; B65D 1/24
[52] U.S. Cl. ............................... 206/532; 206/538; 206/561; 206/601; 220/501; 220/524; 220/528
[58] Field of Search .............. 206/532, 538, 539, 601, 206/561; 220/501, 524, 528

[56] References Cited

U.S. PATENT DOCUMENTS

| | | | |
|---|---|---|---|
| 3,703,955 | 11/1972 | Inacker | 206/532 |
| 4,084,695 | 4/1978 | Halbich | 206/532 |
| 4,253,572 | 3/1981 | Halbich | 206/538 |
| 4,372,445 | 2/1983 | Keffeler | 206/532 |
| 4,735,318 | 4/1988 | Keffeler | 206/532 |
| 4,741,441 | 5/1988 | Keffeler | 206/532 |
| 4,793,492 | 12/1988 | Halbich | 206/538 |

*Primary Examiner*—Bryon P. Gehman
*Attorney, Agent, or Firm*—Zarley, McKee, Thomte, Voorhees & Sease

[57] ABSTRACT

A medication dispenser includes a reusable container adapted to receive one or more disposable multicompartment liners for sanitary storage of medication out of contact with the reusable container. The open-topped compartments of the liner are closed by individual covers which are locked onto the container with a fracturable tab which must be broken to open a compartment. The covers are designed to form at least a Class B closure with the liner compartments for tamper-proof sanitary air-tight storage of a patient's medication. When the liners are removed, the broken tabs from the covers may be dumped from the compartments.

1 Claim, 3 Drawing Sheets

MEDICATION DISPENSER WITH REMOVABLE LINER

BACKGROUND OF THE INVENTION

This invention relates generally to a multiple-unit medication container including several unit-dose compartments and more particularly to such a container wherein the unit-dose compartments are formed in a removable liner and sealed by separate covers.

United States Pharmacopeia XXII defines unit-dose container as a single-unit container for articles intended for administration by other than the parenteral route as a single does, direct from the container. Single-unit container is defined as one that is designed to hold a quantity of drug intended for administration as a single dose or a single finished device intended for use promptly after the container is opened. Accordingly, each compartment of a multiple-unit container must meet the above definitions in order to be used in compliance with current federal regulations.

Several such containers have been previously proposed such as those disclosed in Halbich, U.S. Pat. No. 4,253,572 and Keffeler, U.S. Pat. No. 4,372,445. Whereas the Halbich covers are intended to provide an airtight closure for the individual compartments, the lack of any direct connection between each compartment cover and the container itself leaves that container susceptible to undetected displacement of the entire cover assembly for removal of medication from the compartments. The medication dispenser of the inventor's own prior U.S. Pat. No. 4,372,445 provides a direct connection between each compartment cover and the container, but, like Halbich, allows the medication to contact the reusable container.

Whereas, a reusable medication container is advantageous for greatly reducing the labor required for packaging medication since patient identification and dispensing directions can be secured to the container for use with each refill, it is undesirable to have the medication contaminated by possible dust in the container or cross contaminated by previous medication.

Another problem associated with medication containers is that air and moisture deteriorate certain medications. Pills are not placed in individual tamperproof containers for economical reasons but, with many pills stored in a single container, the removal of one pill admits air and moisture to all of the others.

Other problems and objectives for medication containers include providing truly tamperproof compartments for foolproof monitoring of the medications dispensed and limiting the quantity of pills in the container so that the patient is assured of receiving fresh medication in accordance with a prescription which is regularly reviewed. These and other problems were resolved by the medication dispenser of applicant's U.S. Pat. Nos. 4,741,441 and 4,735,318.

In the devices of the '441 and '318 patents, an elongated channel or chamber 32 was provided between the divider walls. The fractured tabs from the individual covers fell into the chamber 32 and could be dumped thereon by removing a closure plate which normally closed the end of the chamber. Even though the fractured tabs could be removed from the chamber of the earlier devices by simply removing the closure plate, it has been found that the need for removing the closure plate and subsequently reinstalling the closure plate involves a step which can be eliminated.

It is therefore a principal object of the invention to provide an improved medication dispensing container including means which facilitates the removal of the fractured tabs from the covers.

Another object of the invention is to provide a medication dispenser which is economincal to manufacture, durable in use and refined in appearance.

SUMMARY OF THE INVENTION

The medication dispenser of the present invention includes a unitary container defining a generally trough-shaped cavity for receiving a disposable multicompartment liner so that medication placed within the liner is maintained out of direct contact with the reusable container. The covers for the individual compartments include sealing surfaces engagable with the liner to afford at least a Class B closure for each compartment.

Each compartment cover includes an integral fracturable tab adapted to be independently snap-fit onto the container to provide a secure and tamperproof closure of each compartment. Several covers are interconnected by fracturable links to form the unitary cover assembly which may be easily handled and snapped onto the container for quickly and easily closing all of the compartments. Likewise, the provision of a single multicompartment liner greatly facilitates the replacement of the liners each time the container is to be refilled.

Medication stored within the container contacts only the disposable liner and disposable covers thereby assuring sanitary storage and preventing contamination of the medication with any previous medications or other foreign matter. The airtight seal on each compartment assures the patient of fresh medication protected from deterioration associated with repeated exposure to air and moisture.

The fractured tabs from the individual covers fall downwardly into a collection chamber which is in commmunication with the container cavities at each side thereof so that the tabs may be easily removed from the container cavities after the liner or liners have been removed therefrom.

DESCRIPTION OF THE PREFERRED EMBODIMENT

Figure 1:
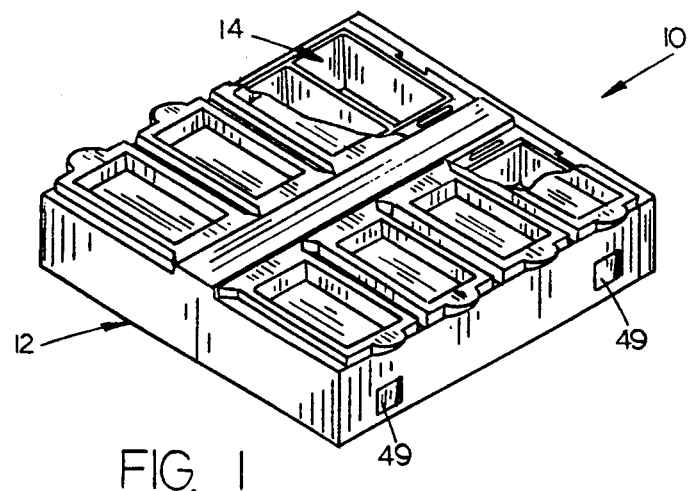
FIG. 1 is a perspective view of the medication dispenser.
Figure 2:
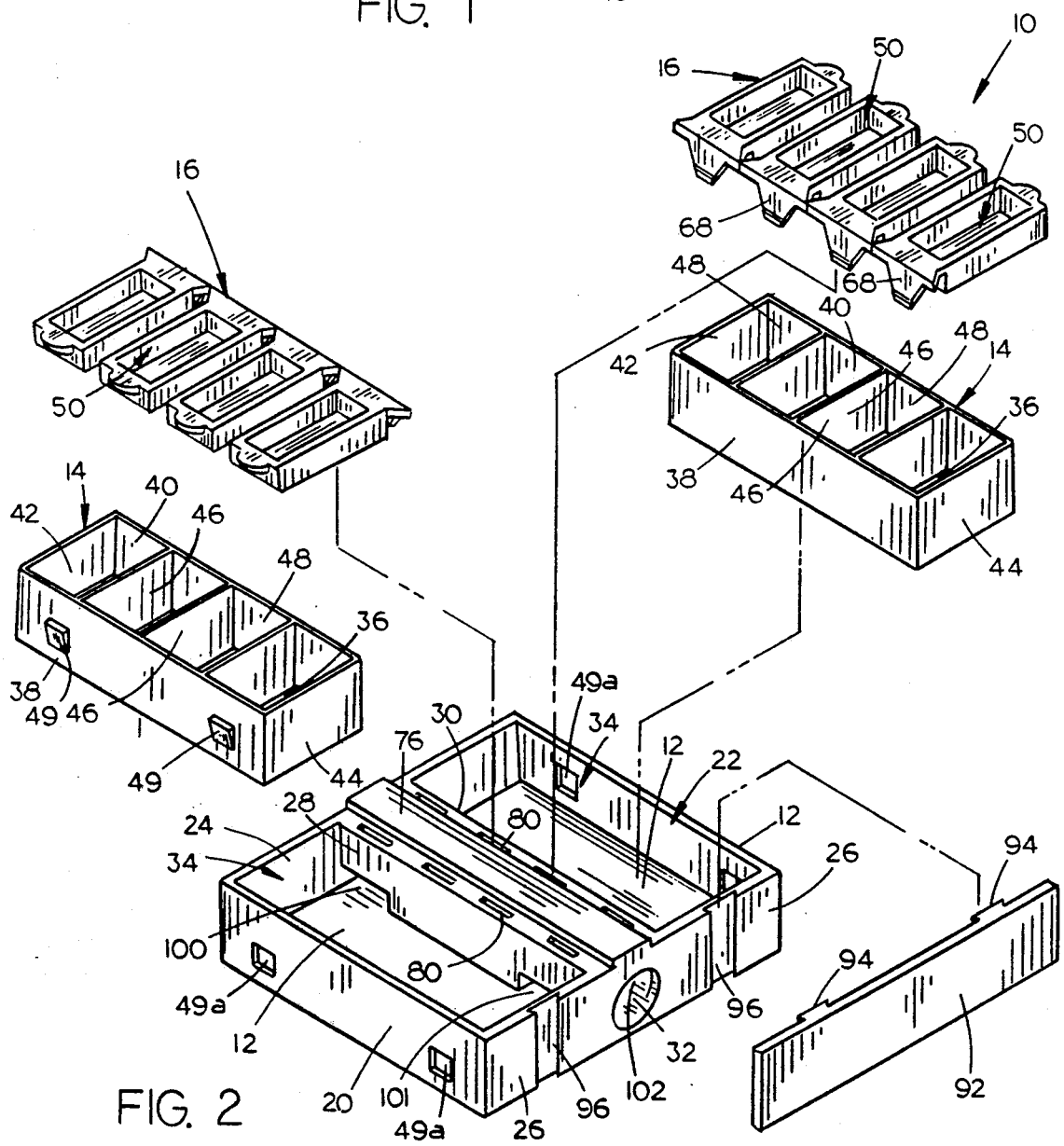
FIG. 2 is an exploded perspective view of the medication dispenser of the invention.

The medication dispenser 10 of the present invention is illustrated in FIGS. 1 and 2 as including a container 12, a pair of removable multicompartment liners 14 and a pair of compartment cover assemblies 16.

Figure 3:
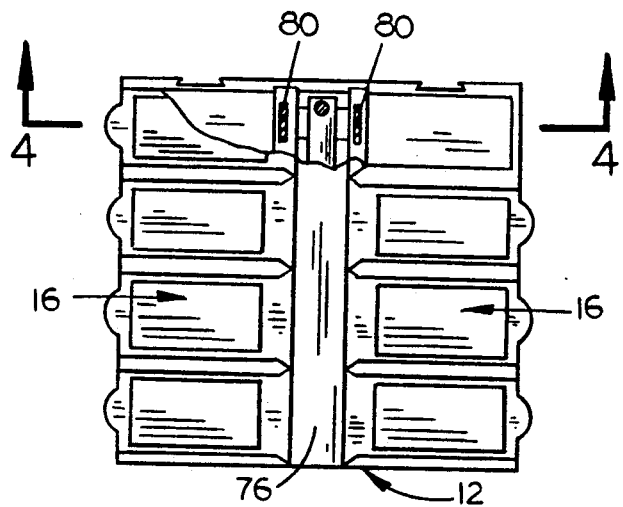
FIG. 3 is a top view of the medication dispenser with portions of the compartment covers broken away to disclose the underlying structure.
Figure 4:
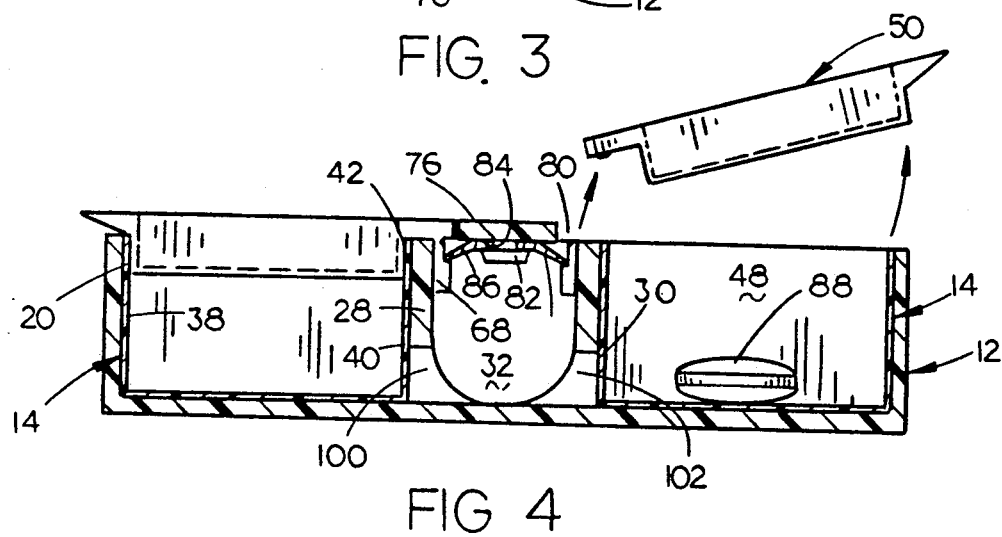
FIG. 4 is an enlarged transverse sectional view taken along line 4—4 in FIG. 3.
Figure 5:
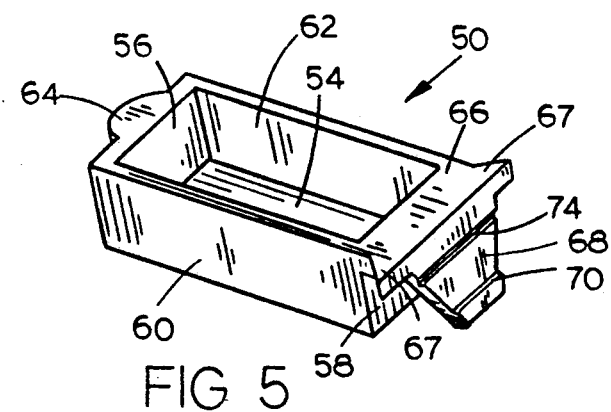
FIG. 5 is an enlarged perspective view of a compartment cover.

Container 12 includes a bottom wall 18, opposite upstanding side walls 20 and 22, opposite upstanding end walls 24 and 26, and a divider wall 28 which extends between the end walls in spaced relation from side wall 20 as seen in FIGS. 2 and 4. A second divider wall 30 is positioned in spaced relation from the other side wall 22 and from divider wall 28 so as to form an elongated channel or chamber 32 (FIGS. 2 and 3) between the divider walls. Likewise, an elongated generally trough shaped cavity 34 is arranged between each divider wall and the adjacent container side wall.

The removable liner 14 is illustrated in FIGS. 2 and 4 as insertable into a container cavity 34 so as to substantially fill the cavity and line the bottom wall, side walls, and end walls thereof. Liner 14 includes a bottom wall 36, side walls 38 and 40 and end walls 42 and 44 which are adapted to be engaged flush against the corresponding walls of the container. Liner 14 additionally includes one or more partitions 46 extended between side walls 38 and 40 to define a row of open-topped compartments 48. The partitions preferably engage the bottom wall so the transfer of medication between compartments is blocked.

To removably secure the liners 14 into the container cavities 14, at least the outer wall 38 of each liner is provided with one or more tabs 49 as shown in FIG. 2 for snap fit into aligned apertures 49a through the container side walls 20 and 22. These coacting tabs and apertures prevent lifting of the liner upon removal of the individual compartment covers.

FIG. 2 shows a unitary cover assembly 16 which includes a sufficient number of individual compartment covers 50 for closing all of the compartments 48 of one liner 14. Each cover 50 is adapted to overlie and close a respective one of the liner compartments 48 upon insertion of the cover 50 into the liner 14.

Referring to FIGS. 2 and 4-7, each cover 50 is generally trough shaped and includes a generally horizontally extended bottom 54 and opposite end walls 56 and 58 and side walls 60 and 62 extended upwardly therefrom. A semicircular extension 64 at the top edge of each end wall 56 facilitates lifting the cover 50 to open a compartment 48. At the top of the inner end wall 58, an integral flange 66 extends generally horizontally away from the end wall 58 and flares outwardly to form fracturable links 66 for interconnecting a plurality of covers so that they may be handled as an integral assembly 16.

An important feature of each compartment cover 50 is the locking tab 68 which functions to independently secure each compartment cover 50 to container 12. Each tab is a generally flat downwardly tapering member arranged parallel to end wall 58. The spacing between tab 68 and end wall 58 is just sufficient for receiving a container divider wall 28 and liner end wall 42 between them as illustrated in FIG. 4. Each tab 68 is further provided with an upwardly facing shoulder 70 on the interior side thereof and a weakened upper portion 72 formed by a notch 74 adjacent the juncture of the tab to extension 66.

Before describing the connection of each cover 50 to the container 12, a description of the remaining structure of the container would be helpful. In FIGS. 2-4, a top wall 76 extends between and is connected to the upper edges of both divider walls 28 and 30. The top wall 76 cooperates with the divider walls 28 and 30 to define a plurality of elongated spaced apart openings 80 for receiving the tabs 68 of the compartment covers 50.

In FIG. 4, the under side of top wall 76 is shown as including a plurality of fasteners 82 in longitudinally spaced apart relation for supporting a spring strip 84 which includes a plurality of spaced apart downwardly and exteriorly inclined pawls 86. A similar structure for fracturable connection of covers onto a medication dispenser is shown and described in the inventor's U.S. Pat. No. 4,372,445 which is incorporated herein by reference.

Referring to FIG. 4, when a compartment cover 50 is applied onto the container 12, the tab 68 deflects the pawl 86 downwardly to allow passage of the tab through the slot defined between the pawl 86 and divider wall 28. As the cover reaches its seated position with extension 66 in engagement with the divider wall 28, the upwardly facing shoulder 70 on tab 68 is moved downwardly of pawl 86 allowing it to snap back against the tab above the shoulder so as to function somewhat like a ratchet to prevent vertical upward removal of the tab through the opening 80.

Note that the liners 14 are inserted into the container cavities 34 prior to attachment of the cover assemblies 16 or 50. Accordingly, at the same time that the covers 16 or 50 are seated on the container 12, the trough shaped covers are depressed into the liner compartments 48 in snug-fit relation so as to close and seal each of the open-topped compartments. The outwardly protruding semicircular extension 64 on the outer end of each cover 50 engages the outer side wall 20 of the liner as shown in FIG. 4 to positively seat the cover onto and within the liner compartment 48.

Figure 6:
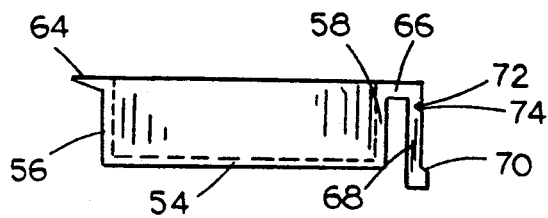
FIG. 6 is a side elevational view of a compartment cover.
Figure 7:
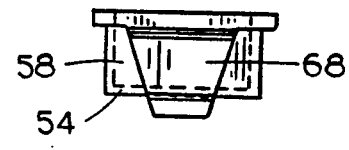
FIG. 7 is an end elevational view of a compartment cover.
Figure 8:
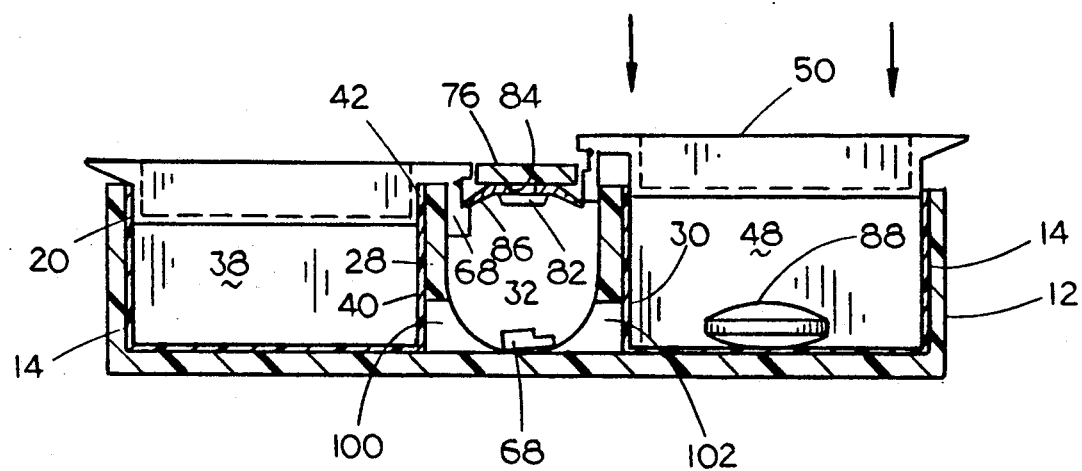
FIG. 8 is an enlarged partial sectional view as seen on lines 4—4 of FIG. 3.

When a compartment is to be opened, the outer end of cover 50 is pivoted upwardly which results in the fracture of the tab 68 at weakened portion 72 as indicated in FIG. 6. Similarly, the fracturable links 67 connecting that cover to adjacent covers are similarly fractured. In FIG. 4, it is seen that the fractured tab 68 is held in place by the pawl 86. After all of the covers have been opened and fractured from the container, the liners 14 can be lifted freely from the container cavities 34. The liners will generally be disposed of and replaced with new liners to provide a sanitary environment for storing the next refill of medication such as the pill 88 shown in FIG. 4. A new cover 50 is then applied onto the refilled compartment to provide at least a Class B closure. In FIG. 4, it is seen that the tab 68 of the new cover will dislodge the former tab 68 from the pawl 86 and push it downwardly into the chamber 32 between divider walls 28 and 30.

In FIG. 1, it is seen that the end of chamber 32 is closed by a closure plate 92 provided with flaring tenons 94 adapted for receipt within the mortises 96 in the container end wall 26 for a dovetail connection between them. It is apparent that any suitable closure could be substituted which affords access to chamber 32 for removing the fractured tabs 68.

Although the closure plate 92 does provide a convenient means for selectively closing the end of the chamber 32, to maintain the fractured tabs therein, it has been found that fractured tabs 68 are more easily removed from the dispenser, after the liners 14 have been lifted from the container cavities 34, by providing a pair of channels 100 and 101 and a pair of channels 102 and 103 (not shown) in the walls 28 and 30 respectively which provides communication between the chamber 32 and the container cavities 34. Thus, when the liners 14 have been removed from the dispenser, the dispenser may be simply tilted one way or the other so that the fractured tabs 68 in the chamber 32 pass from the chamber 32 into either of the cavities 34. When the tabs 68 have slid or passed through the channels 100, 101, 102 and 103 (not shown), into one of the cavities 34, the dispenser is simply inverted to cause the tabs 68 to fall from the cavity 34.

It can therefore be seen that the invention accomplishes at least all of its stated objectives.

I claim:

1. A medication dispenser, comprising, a container comprising at least a pair of upstanding side walls, opposite upstanding end walls, and a pair of spaced apart divider walls extending between said end walls in spaced relation from said side walls to define a pair of spaced apart, generally trough-shaped cavities, an elongated tab collection chamber positioned between said divider walls for collecting tabs fractured from said covers, a multicompartment liner removably insertable into each of said cavities, each of said liners defining a plurality of open-topped compartments whereby medication placed within said compartments is maintained out of direct contact with said container, a plurality of disposable compartment covers, each adapted to overlie and close a respective one of said compartments, each cover including a separate integral fracturable tab adjacent to one end thereof, coating lock means on said container and on the individual tabs for independently securing each tab in snap-fit locked relation onto said container, each cover being fractured from its respective tab in response to upward movement of the opposite end of said cover to open said compartment, each of said divider walls having at least one opening formed therein which extends between said tab collection chamber and the cavity adjacent thereto to permit the fractured tabs to pass from said collection chamber into said cavity when the associated liner is removed therefrom to permit the fractured tabs in the dispenser to be removed therefrom.

* * * * *